United States Patent [19]

Hall et al.

[11] Patent Number: 4,915,137

[45] Date of Patent: Apr. 10, 1990

[54] SHEET PLASTIC FLANGE PROTECTOR

[76] Inventors: James A. Hall, 1519 Hill Rd., Houston, Tex. 77039; Clyde M. Robinson, 12810 Aste La., Houston, Tex. 77065

[21] Appl. No.: 231,958

[22] Filed: Aug. 15, 1988

[51] Int. Cl.$^4$ ............................................. B65D 59/06
[52] U.S. Cl. .................................. 138/96 R; 138/89; 220/324
[58] Field of Search ................... 138/89, 96 R, 96 T, 138/109, 178; 220/324, 327, 240, 241, 238, 352, 356

[56] References Cited

U.S. PATENT DOCUMENTS

| | | | |
|---|---|---|---|
| 899,872 | 6/1908 | Conrad | 138/96 R |
| 1,404,895 | 1/1922 | Rowley | 138/96 R X |
| 2,695,725 | 11/1954 | Chatfield | 220/327 |
| 2,708,453 | 5/1955 | Das | 138/96 R |
| 3,563,277 | 2/1971 | Klepper | 138/96 R |
| 3,807,457 | 4/1974 | Logsdon | 220/356 X |
| 3,942,681 | 3/1976 | Richardson | 138/96 R X |
| 4,014,368 | 3/1977 | Nelsen | 138/96 R |
| 4,233,697 | 11/1980 | Cornwall | 220/327 X |
| 4,348,475 | 9/1982 | Tsuru | 138/89 |
| 4,423,753 | 1/1984 | Smith et al. | 138/96 R |
| 4,643,878 | 2/1987 | Seiter et al. | 220/327 X |

*Primary Examiner*—James E. Bryant, III
*Attorney, Agent, or Firm*—Neal J. Mosely

[57] ABSTRACT

A flange protector for use with flanged pipe, pressure vessels and the like, having a peripheral flange with an outer peripheral surface and a central opening for the pipe or vessel and having holes in the flange for receiving bolts. The flange protector comprises a sheet-form plastic cover member with a dished central portion fitted into the central opening of the flange and a portion extending radially outward to cover the flange and the holes therein and an edge portion extending normal thereto to cover at least part of the peripheral surface of the flange. The radially extending cover portion is secured to the flange by the flange holes. The flange is a female flange with holes therein, the cover member radially extending portion has indentations or hollow protrusions fitting into each of the flange holes, each having an aperture with fasteners positioned therein extending into the flange holes to secure the cover member in place.

1 Claim, 1 Drawing Sheet

SHEET PLASTIC FLANGE PROTECTOR

BACKGROUND OF THE INVENTION

1. Field of the Invention

This invention relates generally to flange protectors for the flanges on flanged pipe, pressure vessels, and the like, and more particularly to removable, sheet plastic flange protectors constructed to be secured to the holes on female flanges.

2. Brief Description of the Prior Art

Sheet-form protectors are known for pipes and other structures. The prior art, however, does not show flange protectors for use with flanged pipe, pressure vessels and the like.

There are several patents which disclose various types of protectors or guards.

Tsuru U.S. Pat. No. 4,348,875 discloses a closure member for retaining lubricant in a drive shaft while in storage.

Logsdon U.S. Pat. No. 3,823,744 discloses a cup-shaped cover or protector for the ends of pipe arranged to cover bolts extending from a flange.

Logsdon U.S. Pat. No. 3,807,457 discloses a snap-on, cup-shaped cover or protector for the ends of pipe.

Weslowski U.S. Pat. No. 3,334,662 discloses a rigid, flat cover or protector for the ends of pipe secured in place by external hooks.

Hitz U.S. Pat. No. 3,329,447 discloses a flat, rigid cover for high pressure vessels.

Gratzmuller U.S. Pat. No. 2,746,486 discloses a flat, rigid cover with a flanged connection for high pressure vessels.

Croteau U.S. Pat. No. 3,289,288 discloses a flanged closure member used in installing pipe liners.

Lambert U.S. Pat. No. 3,207,184 discloses a flanged pipe connector with an end closure.

The present invention is distinguished over the prior art in general, and these patents in particular by a flange protector for use with flanged pipe, pressure vessels and the like, having a peripheral flange with an outer peripheral surface and a central opening for the pipe or vessel and having holes in the flange for receiving bolts. The flange protector comprises a sheet-form plastic cover member with a dished central portion fitted into the central opening of the flange and a portion extending radially outward to cover the flange and the holes therein and an edge portion extending normal thereto to cover at least part of the peripheral surface of the flange. The radially extending cover portion is secured to the flange by the flange holes. The flange is a female flange with holes therein and the cover member radially extending portion has indentations fitting into each of the flange holes, each having an aperture with fasteners positioned therein extending into the flange holes to secure the cover member in place.

SUMMARY OF THE INVENTION

It is therefore an object of the present invention to provide a new and improved flange protector for flanged pipe connections, pressure vessels, and the like.

It is another object of this invention is to provide a new and improved flange protector for flanged pipe connections, pressure vessels, and the like, formed of a sheet-form plastic material.

Another object of this invention is to provide a new and improved flange protector for flanged pipe connections, pressure vessels, and the like, formed of a sheet-form plastic material contoured to fit the central opening and peripheral surface of the flange.

Another object of this invention is to provide a new and improved flange protector for flanged pipe connections, pressure vessels, and the like, having an embodiment to fit a female flange.

Still another object of this invention is to provide a new and improved flange protector for flanged pipe connections, pressure vessels, and the like, formed of a sheet-form plastic material contoured to fit the central opening and peripheral surface of the flange and having openings aligned with the flange openings of a female flange for insertion of retaining members therethrough.

A further object of this invention is to provide an improved flange protector for flanged pipe connections, pressure vessels, and the like, formed of a sheet-form plastic material contoured to fit the central opening and peripheral surface of the flange and having indentations aligned with and fitting the flange openings of a female flange with openings in the indentations for insertion of retaining members therethrough.

Other objects of the invention will become apparent from time to time throughout the specification and claims as hereinafter related.

The above noted objects and other objects of the invention are accomplished by a novel flange protector is for use with flanged pipe, pressure vessels and the like, having a peripheral flange with an outer peripheral surface and a central opening for the pipe or vessel and having holes in the flange for receiving bolts. The flange protector comprises a sheet-form plastic cover member with a dished central portion fitted into the central opening of the flange and a portion extending radially outward to cover the flange and the holes therein and an edge portion extending normal thereto to cover at least part of the peripheral surface of the flange. The radially extending cover portion is secured to the flange by the flange holes. The flange is a female flange with holes therein and the cover member radially extending portion has indentations fitting into each of the flange holes, each having an aperture with fasteners positioned therein extending into the flange holes to secure the cover member in place.

BRIEF DESCRIPTION OF THE DRAWINGS

FIG. 1 is an exploded, isometric view of a flange protector for female flanges on flanged pipe, pressure vessels, and the like.

FIG. 2 is cross section of the flange protector of FIG. 2 installed on a female flange on flanged pipe, pressure vessels, and the like.

DESCRIPTION OF ONE PREFERRED EMBODIMENT

Figure 1:
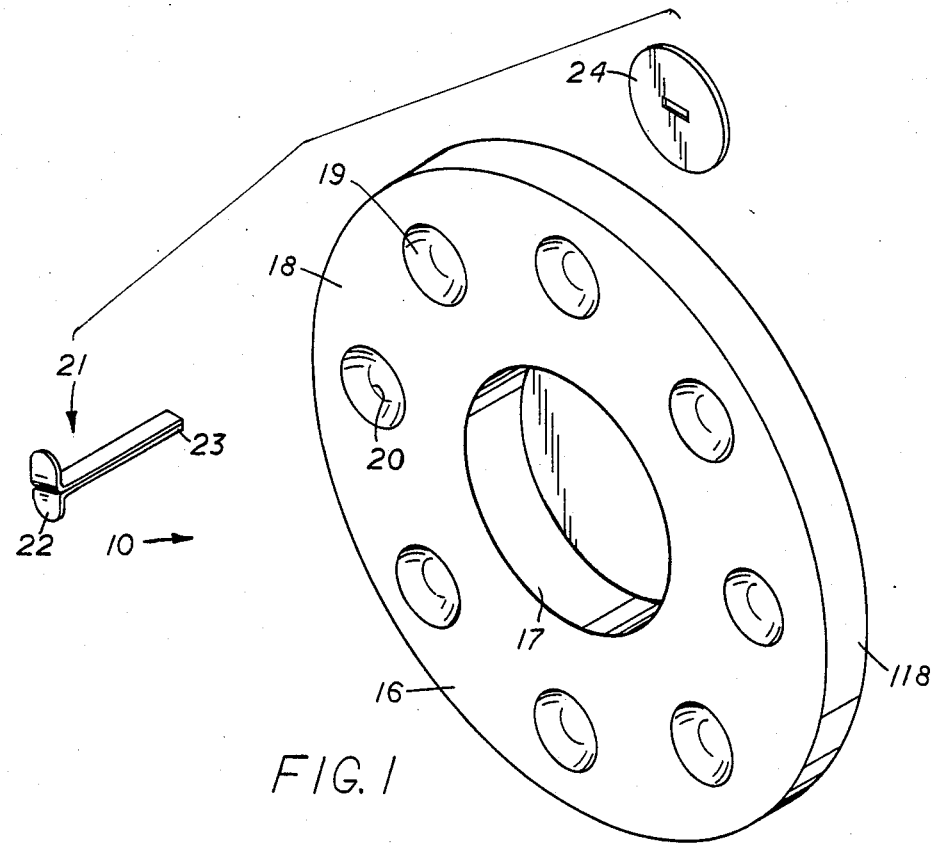
Figure 2:
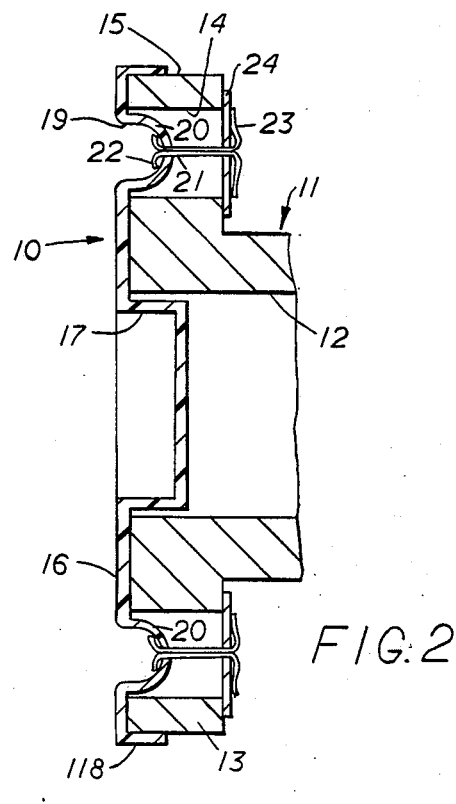

Referring to the drawings by numerals of reference, and more particularly to FIGS. 1 and 2, there is shown a flange protector 10 for use with female flange pipe, pressure vessels and the like, having a peripheral female flange 11. Flange 11 has a peripheral surface 15, a central opening 12 and a flange portion 14 with holes 14 for receiving bolts (not shown) for securing a flanged joint together.

Flange protector 10 comprises a sheet-form plastic cover member 16 with a cylindrically dished central portion 17 which fits central opening 12 of flange 11. A portion 18 of flange protector 10 extends radially outward to cover the flange and holes 14 and an edge portion 118 extends normal thereto to cover at least part of the peripheral surface of the flange.

Radially extending portion 18 has indentations or hollow protrusions 19 therein with holes or apertures 20. Indentations 19 are sized and spaced to fit each of holes 14. Fasteners or brads 21 fit through apertures 20 with heads 22 securing them in indentations 19. Brads 21 extend through holes 14 and slotted washers 24 and the end portions 23 bent outward to secure flange protector 10 in place. Flange protector 10 thus protects the end face of flange 11 from damage and is easily removed when the flange is ready to be used.

OPERATION

While the operation of this invention should be obvious from the foregoing description, it will be restated for clarity. The flange protector 10 functions to protect the flange face and holes 14 of the female flange. The flange protectors are fitted over the flange faces and cover at least part of peripheral surfaces 15 while centrally dished portion 17 fits into and closes central opening 12 of the flange.

As previously noted, indentations 19 on female flange protector 10 cover holes 14 in the female flange being protected.

While this invention has been shown fully and completely with special emphasis on certain preferred embodiments, it should be understood that within the scope of the appended claims the invention may be practiced otherwise than as specifically described herein.

We claim:

1. The combination of a temporary, removable flange protector with a flanged pipe or pressure vessel having a circular peripheral connecting flange with an outer peripheral surface and an end face with a central opening for the pipe or vessel and having holes in the flange for receiving bolts, said protector comprising a sheet-form plastic cover member having a cylindrical protrusion fitted into the central opening of said flange, said cover member having a portion extending radially outward a distance sufficient to cover the entire end face of said flange and the holes therein and an edge portion extending normal thereto to cover at least part of and fit flush against the entire periphery of said flange, said cover member radially extending portion having a plurality of hollow protrusions aligned with and fitting into each of said flange holes, at least some of said protrusions having apertures through the wall thereof, and fasteners positioned in said protrusion apertures having head portions retained therein and extending through said apertures and the flange holes to secure said cover member on said flange with said protrusions secured in said holes.

* * * * *